United States Patent [19]

Ohmori et al.

[11] 4,254,000
[45] Mar. 3, 1981

[54] EPOXY RESIN COMPOSITION

[75] Inventors: Akira Ohmori; Masayoshi Shinjo, both of Osaka, Japan

[73] Assignee: Daikin Kogyo Co., Ltd., Osaka, Japan

[21] Appl. No.: 88,816

[22] Filed: Oct. 26, 1979

[30] Foreign Application Priority Data

Oct. 27, 1978 [JP] Japan ................................ 53-132859

[51] Int. Cl.³ ........................ C08G 59/30; C08L 63/00
[52] U.S. Cl. ............................... 260/18 PN; 525/481; 525/510; 528/402
[58] Field of Search .................. 260/18 PN; 525/481, 525/510

[56] References Cited

U.S. PATENT DOCUMENTS

| | | | |
|---|---|---|---|
| 3,663,354 | 5/1972 | Ueno et al. | 525/481 X |
| 3,686,358 | 8/1972 | Bertram | 525/481 X |
| 3,879,430 | 4/1975 | O'Rear et al. | 528/402 X |

*Primary Examiner*—Earl A. Nielsen
*Attorney, Agent, or Firm*—Birch, Stewart, Kolasch & Birch

[57] ABSTRACT

An epoxy resin composition which comprises (1) an epoxy resin represented by the formula:

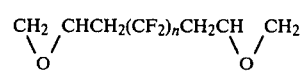

wherein n is an integer of 4 to 18 and (2) at least one of an initial condensation product of amino resin, an initial condensation product of amide resin and an initial condensation product of phenol-formaldehyde, which can afford hardened products being improved in contamination-preventing property, particularly adhesion resistance at high temperatures.

3 Claims, No Drawings

EPOXY RESIN COMPOSITION

The present invention relates to an epoxy resin composition. More particularly, it relates to an epoxy resin composition which can afford hardened products.

Epoxy resins are prepolymers, whose compositions containing a hardening agent show a good close-adhering property to various kinds of substrates and are thus useful for paints and adhesives. Hardened products obtained finally from such compositions are employed in laminated structures, materials for civil engineering and construction and electric materials. However, such hardened products are not sufficient in contamination-preventing property and especially in adhesion-resistance at high temperatures.

As to hardened products of fluorine-containing epoxy resin compositions containing $BF_3$—$C_2H_5NH_2$ as a hardening agent, it is known that, in case of a fluoroalkylene group-containing epoxy resin, for example, an epoxy resin represented by the formula:

wherein m is an integer of 2 or 3, the water and oil-repelling property of the hardened product becomes more enhanced when the fluorine content of the epoxy resin is larger, and that, in comparison with the hardened product of an epoxy resin represented by the formula:

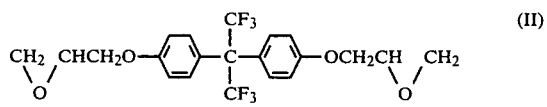

the hardened product of the fluoroalkylene group-containing resin has a smaller water-repelling property and an almost equal oil-repelling property, when the fluorine contents of the two epoxy resins are equal.

It is also known that the water and oil-repelling property is improved by incorporation of a small amount of a perfluoroalkyl group-containing monoepoxide into a fluoroalkylene group-containing epoxy resin such as the above mentioned epoxy resin (I).

A main object of the present invention is to provide an epoxy resin composition which can afford hardened products being improved in contamination-preventing property, particularly adhesion-resistance at high temperatures. Another object of this invention is to provide an epoxy resin composition which can afford hardened products showing an excellent water and oil-repelling property without addition of a monoepoxide containing a specific perfluoroalkyl group.

These objects may be attained by employing as the compounds of an epoxy resin composition (1) an epoxy resin represented by the formula:

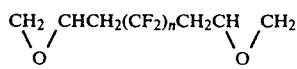

wherein n is an integer of 4 to 18 and (2) at least one of an initial condensation product of amino resin, an initial condensation product of amide resin and an initial condensation product of phenol-formaldehyde.

The epoxy resin composition of the invention is characteristic in containing as the hardening agent for the epoxy resin (1) the specific substance (2). By the use of this specific hardening agent, the composition of the invention can afford a hardened product being superior in water and oil-repelling property and in contamination-preventing property, in comparison with an epoxy resin composition containing an other hardening agent (e.g. $BF_3$—$C_2H_5NH_2$). Further, the hardened product of the epoxy resin composition of the invention shows a large adhesion-resistance at high temperature, so that the composition is useful as a frame-releasing agent for molding of plastics and rubbers. The composition is also useful as a contamination-preventing paint, especially in the case that thermal resistance or chemical resistance is required.

The frame-releasing agent is a substance which is employed in injection molding of plastics and rubbers by the use of a metal frame. In the case that melted plastic or rubber adheres to the metal frame, and the molded product can not be separated or is hardly separated from the metal frame, the frame-releasing agent forms on the surface of the metal frame a semi-permanent coating not showing adhesive property even at high temperatures or a thin film at each molding and makes it possible to release the molded product from the metal frame without damaging the product. As such metal-releasing agent forming a semi-permanent coating, there is known polytetrafluoroethylene, and as the one forming a thin film, silicon resin emulsion and silicon oil are employed. However, polytetrafluoroethylene as the former frame-releasing agent requires a high baking temperature (molding temperature) and a special procedure for operation. When the formed coating is damaged, in addition, its repair is extremely difficult. As to the latter frame-releasing agent, on the other hand, the conventional agents are insufficient in durability, and frequent application (thin film formation) is necessitated. In some cases, the use of a large amount of the agent is required, which may cause adherence of the agent to the molded product.

The coating (thin film) formed from the epoxy resin composition of the invention shows a good durability, and with a coating once formed, molding can be repeated 3 or 4 times.

The epoxy resin (1) to be used in the epoxy resin composition of the invention may be prepared by addition of allyl alcohol to a perfluoroalkylene diiodide, followed by treatment with an alkali so as to obtain an epoxy product. The addition progresses advantageously under the radical action of an peroxide, an azo compound, X-rays, light, heat or the like. For example, the reaction may be carried out at 50° to 150° C. in the presence of a radical-initiating agent such as a peroxide or an azo compound. The amount of the perfluoroalkylene diiodide to be used is usually in the range of 0.1 to 8 mols, preferably 0.5 to 4 mols, to 1 mol of allyl alcohol. As the alkali in the subsequent epoxidation, sodium hydroxide, potassium hydroxide or the like may be employed.

The hardening agent (2) has been per se employed for hardening of ordinary epoxy resins and is readily available on market. The initial condensation product of amino resin used as the hardening agent (2) includes, for example, an initial condensation product of urea resin, melamine resin or urea-melamine resin. The initial condensation product of urea resin is a condensation product of urea and formaldehyde having an average molecular weight of less than 2000 in which the molar ratio of formaldehyde to urea is from 1:1 to 3:1 and methylol groups may be alkylated with $C_1$-$C_4$ alkyl groups or benzylated. The initial condensation product of melamine resin is a condensation product of melamine and formaldehyde having an average molecular weight of less than 3000 in which the molar ratio of formaldehyde to melamine is from 1:1 to 5:1 and methylol groups may be alkylated with $C_1$-$C_4$ alkyl groups or benzylated.

The initial condensation product of phenol-formaldehyde resin is a condensation product of phenol and formaldehyde having an average molecular weight of less than 1000, preferably 300 to 700 when the product is a resol type or of less than 2000, preferably 1200 to 1500 when the product is a novolak type in which the molar ratio of formaldehyde to phenol is from 1:1 to 3:1.

The initial condensation product of amide resin is a condensation product of a dimer or a trimer of $C_{12}$-$C_{20}$ unsaturated fatty acid and polymethylenediamine having 1 to 6 carbon atoms, diethylenetriamine or triethylenetetramine having an average molecular weight of less than 1500, preferably 500 to 1200, and preferably has an amine value of 200 to 350.

The initial condensation products soluble in water or an organic solvent such as alcohol (e.g. methanol) or an aliphatic hydrocarbon are preferably employed.

As the initial condensation product of amino resin, for example, there are known urea resins such as "Melan 11" (Hitachi Chemical Co., Ltd.), "Uhban 10R" (Mitsui Toatsu Chemicals, Inc.) and "Cibamin H 53" (Ciba-Geigy (Japan) Ltd.), melamine resins such as "Cibamin M 86" (Ciba-Geigy (Japan) Ltd.) and "Melan 27" and "Melan 28" (Hitachi Chemical Co., Ltd.) and urea-melamine resins such as "Melan 14" (Hitachi Chemical Co., Ltd.). As the initial condensation product of amide resin, there are known "Hitamide 410" and "Hitamide 420" (Hitachi Chemical Co., Ltd.), "Tomaide 215", "Tomaide 225", "Tomaide 245" and "Tomaide 255" (Fuji Kasei K.K.), "HT 800", "HY 815", "HY 825", "HY 840" (Ciba-Geigy (Japan) Ltd.), "DEH 10", "DEH 11", "DEH 12" and "DEH 14" (Dow Chemical). As the initial condensation product of phenol-formaldehyde resin, there are known "Hitanol 4010" and "Hitanol 4020" (Hitachi Chemical Co., Ltd.), "Super Peckasite 1001" (Nihon Reichold Co., Ltd.) and "Varcum 1281 B" (Varcum Chem.).

The mixing proportion of the epoxy resin (1) and the hardening agent (2) in the epoxy resin composition of the invention may be usually 1:0.1-15, preferably 1:0.5-3, by weight. When the proportion of the hardening agent is smaller than the lower limit, hardening is apt to become incomplete, and the hardened product may be soft and readily damaged. When larger than the upper limit, the contamination-preventing property of the hardened product tends to be insufficient, and the releasing property will be poor.

The epoxy resin composition of the invention may be a simple mixture of the epoxy resin (1) and the hardening agent (2), which can be hardened well by sufficient stirring. But, it is more preferable to effect the so-called pre-condensation by heating a mixture of those components at 60° to 150° C. The heating time is dependent on the temperature and usually in the range of 1 to 10 hours. This pre-condensation makes avoided the evaporation of the epoxy resin (1), especially the low molecular weight epoxy resin, at the hardening temperature. Further, in case of combinations of the epoxy resin (1) and the hardening agent (2) in which the miscibility of the components is insufficient to afford a non-uniform composition even under sufficient stirring or to afford a non-uniform hardened product, the pre-condensation can avoid such disadvantage.

The pre-condensation of these components may be effected in the presence or absence of an organic solvent such as xylene, butanol, benzene, toluene or methyl ethyl ketone. The pre-condensation product is a substance in which at least a part of the components participates in addition reaction and an incompletely hardened state is maintained and which is in a somewhat viscous liquid state.

In the hardening of the epoxy resin composition of the invention, it is preferable to heat the pre-condensation product at 100° to 200° C. for 0.5-4 hours. Direct hardening of the epoxy resin composition without the pre-condensation is also possible by heating at 100° to 200° C. for 1 to 6 hours.

For the use as a frame-releasing agent, the epoxy resin composition of the invention or its pre-condensation product may be, as such or diluted with a suitable solvent such as xylene, methyl ethyl ketone or butanol for decreasing the viscosity, applied to the surface of a metal frame. The application may be effected by any of conventional procedures such as brushing, spraying and immersion.

The epoxy resin composition of the invention may be employed as the frame-releasing agent for synthetic resins such as polyurethane, polyethylene, polystyrene, phenol resin and vinyl chloride resin and natural and synthetic rubbers.

The present invention will be hereinafter explained further in detail by the following Examples wherein parts are by weight unless otherwise indicated.

EXAMPLE 1

A mixture of a compound of the formula:

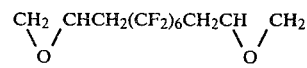

(10 parts) and Melan 27 (3 parts) was heated at 120° C. for 2 hours. The heated mixture was then applied to the surface of an aluminum plate and hardened under heating at 150° C. for 1.5 hours.

On the hardened film thus formed, foaming of urethane was effected to investigate the frame-releasing property of urethane foam. The test was carried out in the following manner. The solutions (A) and (B) (described below) were mixed together and stirred for 10 minutes under a rate of 1500 rpm. The resultant mixture was placed on the hardened film obtained above and kept at room temperature (about 25° C.) for 10 minutes for foaming. The thus formed urethane foam was released from the aluminum plate, and the releasing state was observed. This operation was repeated, and the number of times of release was counted.

| | Part(s) |
|---|---|
| Solution (A):- | |
| Polyol ("PPG-SV-450L" manufactured by Mitsui Toatsu Chemicals, Inc.) | 100 |
| Foaming agent ($CCl_3F$) | 44 |
| Triethylene diamine (33%) | 0.3 |
| Foam-regulating agent ("L-5320" manufactured by Toray Sicilone K.K.) | 1.5 |
| N,N-Dimethylethanolamine | 1.5 |
| Solution (B):- | |

-continued

|  | Part(s) |
|---|---|
| 4,4'-Diphenylmethane diisocyanate | 115.4 |

The results are shown in Table 1.

TABLE 1

| Epoxy resin | Releasing state 1 2 3 4 5 | Number of times of release |
|---|---|---|
| $CH_2\underset{O}{\diagdown\diagup}CHCH_2(CF_2)_6CH_2CH\underset{O}{\diagdown\diagup}CH_2$ | ⊚ ○ ○ △ x | 4 |
| Epicoat 828 (for comparison) | x x — — — | 0 |

⊚ = The molded product can be taken out easily even when a force is hardly given.
○ = The molded product can be taken out under a slight force
○^△ = The molded product can be taken out under some force.
△ = The molded product can be taken out with difficulty under a force.
x = The molded product adheres to the film and can not be taken out even under a force.

EXAMPLE 2 and COMPARATIVE EXAMPLE 1

A mixture of a compound of the formula:

$$CH_2\underset{O}{\diagdown\diagup}CHCH_2(CF_2)_6CH_2CH\underset{O}{\diagdown\diagup}CH_2$$

(100 parts) and a hardening agent as shown in Table 2 was heated at 110° C. for 4 hours. The resultant composition was applied to the surface of an aluminum plate and hardened under heating at 150° C. for 2 hours. On the hardened film thus formed, the frame-releasing property of urethane foam was investigated as in Example 1.

For comparison, the same test as above was effected by the use of compositions containing other hardening agents (e.g. diaminophenylmethane, succinic anhydride) and a commercially available hardenable releasing agent of silicone (manufactured by Frekote Inc.). The results are shown in Table 2.

TABLE 2

| | Hardening agent | Amount (part) | Releasing state 1 2 3 4 5 | Number of times of release |
|---|---|---|---|---|
| Example 2 | Melan 11 | 30 | ○ ○ △ x — | 3 |
| | Melan 14 | 20 | ○ ○ ○ △ x | 4 |
| | Melan 27 | 30 | ⊚ ○ ○ △ x | 4 |
| | Melan 28 | 30 | ○ ○ ○ △ x | 4 |
| | Hitanol 4010 | 30 | ○ ○ △ x — | 3 |
| | Hitanol 4020 | 30 | ○ △ △ x — | 3 |
| Comparative Example 1 | Diaminodiphenylmethane | 26 | x — — — — | 0 |
| | Succinic anhydride | 24 | x — — — — | 0 |
| | Hardenable frame-releasing agent of silicone | | 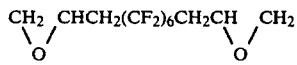 x — — — | 1 |

EXAMPLE 3

Using a compound of the formula:

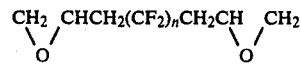

(n being an integer shown in Table 3), the preparation of a composition, the application to an aluminum plate, the hardening and the test of frame-releasing property of urethane foam were effected as in Example 1. The results are shown in Table 3.

TABLE 3

| n | Releasing state 1 2 3 4 5 | Number of times of release |
|---|---|---|
| 4 | ○ ○ ○ △ x | 4 |
| Mixture of 1–14 | ○ ○ ○ ○ △ | 5 |

EXAMPLE 4 and COMPARATIVE EXAMPLE 2

The composition obtained in Example 1 was applied to the surface of a steel frame and heated at 150° C. for 2 hours for hardening. Into the thus treated frame, the styrene-butadiene rubber composition described below was charged and heated at 160° C. for 10 minutes under a pressure of 35 kg/cm². The molded product was immediately peeled off. This operation was repeated, and the number of times of release was recorded.

For comparison, the frame-releasing test as above was effected by the use of the hardened product of a conventional epoxy resin or silicone oil (a conventional frame-releasing agent). The results are shown in Table 4.

| | Part(s) |
|---|---|
| Styrene-butadiene rubber composition:- | |
| Styrene-butadiene rubber (JIS R-1500 manufactured by Japan Synthetic Rubber Co., Ltd.) | 100 |
| Zinc flower No. 1 (JIS K5102) | 3 |
| Stearic acid | 2 |
| Oil furnace black (NBS 387) | 50 |
| Process oil (manufactured by Japan Synthetic Rubber Co., Ltd.) | 4 |
| Sulfur | 2 |
| Accelerating agent ("Nocceler-CZ" manufactured by Ohuchi Shinko K.K.) | 1 |

TABLE 4

| | Frame-releasing agent | Amount (part) | Number of times of release |
|---|---|---|---|
| Example 4 | $CH_2\underset{O}{\diagdown\diagup}CHCH_2(CF_2)_6CH_2CH\underset{O}{\diagdown\diagup}CH_2$ Melan 27 | 10 3 | 43 |
| Comparative Example 2 | Epicoat 828 Melan 27 | 10 3 | 0 |
| | Silicon oil | | 1 |

EXAMPLE 5 and COMPARATIVE EXAMPLE 3

A mixture of a compound of the formula:

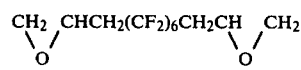

(100 parts) and a hardening agent shown in Table 5 was heated at 110° C. for 4 hours. The resultant composition was applied on the surface of an aluminum plate and heated at 150° C. for 2 hours for hardening. The contact angles of water and of n-hexadecane on the hardened film thus formed are shown in Table 5.

For comparison, the same composition as above but comprising $BF_3$—$C_2H_5NH_2$ as the hardening agent was applied to the surface of an aluminum plate and heated at 150° C. for 1 hour for hardening. The contact angles of water and of n-hexadecane on the hardened film thus obtained are also shown in Table 5.

TABLE 5

| Hardening agent | | Amount (part) | Contact angle (°) | |
|---|---|---|---|---|
| | | | Water | n-Hexadecane |
| Example 5 | Melan 11 | 30 | 101 | 61 |
| | Melan 14 | 20 | 96 | 58 |
| | Melan 27 | 30 | 106 | 62 |
| | Melan 28 | 30 | 105 | 58 |
| | Hitanol 4010 | 30 | 98 | 63 |
| | Hitanol 4020 | 30 | 101 | 62 |
| Comparative Example 3 | $BF_3$—$C_2H_5NH_2$ | 3 | 96 | 41 |

What is claimed is:

1. An epoxy resin composition which comprises (1) an epoxy resin represented by the formula:

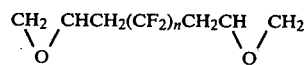

wherein n is an integer of 4 to 18 and (2) at least one of an initial condensation product of amino resin, an initial condensation product of amide resin and an initial condensation product of phenol-formaldehyde.

2. The epoxy resin composition according to claim 1, wherein the mixing proportion of the components (1) and (2) is 1:1.0–15 by weight.

3. The epoxy resin composition according to claim 1 or 2, wherein a mixture of the components is subjected to pre-condensation.

* * * * *

UNITED STATES PATENT AND TRADEMARK OFFICE
CERTIFICATE OF CORRECTION

PATENT NO. : 4,254,000  
DATED : March 3, 1981  
INVENTOR(S) : Akira Ohmori et al It is certified that error appears in the above—identified patent and that said Letters Patent is hereby corrected as shown below:

IN THE ABSTRACT:

Line 8 (counting the formula as one line), change "afford" to --give--;

Line 8, change "being" to --having--;

Line 8, delete "in";

Line 9, change "property" to --properties--.

IN THE SPECIFICATION:

Column 1:

Line 15, change "property" to --properties--;

Line 50, before "contamination-preventing" insert --the--;

Line 51, before "particularly" insert --and--;

Line 66 (counting the formula as one line), before "amino" insert --an--;

Line 67, before "amide" insert --an--.

UNITED STATES PATENT AND TRADEMARK OFFICE
CERTIFICATE OF CORRECTION

PATENT NO. : 4,254,000
DATED : March 3, 1981
INVENTOR(S) : Akira Ohmori et al

It is certified that error appears in the above—identified patent and that said Letters Patent is hereby corrected as shown below:

Column 2:

Line 5, change "afford" to --give--;

Line 5, change "being" to --which is--;

Line 6, change "property" to --properties--;

Line 7, change "property" to --properties--;

Line 8, change "an other" to --another--;

Line 21, change "can not" to --cannot--;

Line 24, before "adhesive" insert --an--;

Line 51, change "an" (first occurrence) to --a--;

Line 63, before "market" insert --the--.

Column 3:

Line 18, after "trimer of" insert --a--;

Line 27, before "amino" insert --an--;

Line 36, before "amide" insert --an--;

Line 42, after "product of" insert --a--;

Line 64, change "makes avoided" to --avoids--.

UNITED STATES PATENT AND TRADEMARK OFFICE
CERTIFICATE OF CORRECTION

PATENT NO. : 4,254,000

DATED : March 3, 1981

INVENTOR(S) : Akira Ohmori et al

It is certified that error appears in the above—identified patent and that said Letters Patent is hereby corrected as shown below:

Column 4:

Line 10, after "in" insert --the--;

Line 21, change "may be," to --may be employed--;

Line 23, before "applied" insert --and--;

Line 25, before "conventional" insert --the--.

Column 5:

In Table 1, in the category of "x = The molded...", change "can not" to --cannot--.

IN THE CLAIMS:

Claim 3:

Line 1, change "claim" to --claims--.

Please add the following claims:

--4. The epoxy resin composition according to claim 1, wherein the initial condensation product of amino resin is an initial condensation product of urea resin, melamine resin or urea-melamine resin.--

UNITED STATES PATENT AND TRADEMARK OFFICE
CERTIFICATE OF CORRECTION

PATENT NO. : 4,254,000
DATED : March 3, 1981
INVENTOR(S) : Akira Ohmori et al

It is certified that error appears in the above—identified patent and that said Letters Patent is hereby corrected as shown below:

--5. The epoxy resin composition according to claim 4, wherein the initial condensation product of urea resin is a condensation product of urea and formaldehyde having an average molecular weight of less than 2000.--

--6. The epoxy resin composition according to claim 4, wherein the initial condensation product of urea resin is a condensation product of urea and formaldehyde having an average molecular weight of less than 2000 in which the molar ratio of formaldehyde to urea is from 1 : 1 to 3 : 1.--

--7. The epoxy resin composition according to claim 4, wherein the initial condensation product of urea resin is a condensation product of urea and formaldehyde having an average molecular weight of less than 2000 in which the molar ratio of formaldehyde to urea is from 1 : 1 to 3 : 1, and wherein the methylol groups are alkylated with $C_1$-$C_4$ alkyl groups or benzylated.--

UNITED STATES PATENT AND TRADEMARK OFFICE
CERTIFICATE OF CORRECTION

PATENT NO. : 4,254,000
DATED : March 3, 1981
INVENTOR(S) : Akira Ohmori et al

It is certified that error appears in the above—identified patent and that said Letters Patent is hereby corrected as shown below:

--8. The epoxy resin composition according to claim 4, wherein the initial condensation product of melamine resin is a condensation product of melamine and formaldehyde having an average molecular weight of less than 3000.--

--9. The epoxy resin composition according to claim 4, wherein the initial condensation product of melamine resin is a condensation product of melamine and formaldehyde having an average molecular weight of less than 3000 in which the molar ratio of formaldehyde to melamine is from 1 : 1 to 5 : 1.--

--10. The epoxy resin composition according to claim 4, wherein the initial condensation product of melamine resin is a condensation product of melamine and formaldehyde having an average molecular weight of less than 3000 in which the molar ratio of formaldehyde to melamine is from 1 : 1 to 5 : 1, and wherein the methylol groups are alkylated with $C_1$-$C_4$ alkyl groups or benzylated.--

UNITED STATES PATENT AND TRADEMARK OFFICE
CERTIFICATE OF CORRECTION

PATENT NO. : 4,254,000
DATED : March 3, 1981
INVENTOR(S) : Akira Ohmori et al

It is certified that error appears in the above—identified patent and that said Letters Patent is hereby corrected as shown below:

--11. The epoxy resin composition according to claim 1, wherein the initial condensation product of phenol-formaldehyde resin is a condensation product of phenol and formaldehyde having an average molecular weight of less than 1000 when the product is a resol type or of less than 2000 when the product is a novolak type.--

--12. The epoxy resin composition according to claim 1, wherein the initial condensation product of phenol-formaldehyde resin is a condensation product of phenol and formaldehyde having an average molecular weight of less than 1000 when the product is a resol type or of less than 2000 when the product is a novolak type in which the molar ratio of formaldehyde to phenol is from 1 : 1 to 3 : 1.--

UNITED STATES PATENT AND TRADEMARK OFFICE
CERTIFICATE OF CORRECTION

PATENT NO. : 4,254,000
DATED : March 3, 1981
INVENTOR(S) : Akira Ohmori et al

It is certified that error appears in the above—identified patent and that said Letters Patent is hereby corrected as shown below:

--13. The epoxy resin composition according to claim 1, wherein the initial condensation product of amide resin is a condensation product of a dimer or a trimer of a $C_{12}$-$C_{20}$ unsaturated fatty acid and polymethylenediamine having 1 to 6 carbon atoms, diethylenetriamine or triethylenetetramine having an average molecular weight of less than 1500.--

--14. The epoxy resin composition according to claim 1, wherein the initial condensation product of amide resin is a condensation product of a dimer or a trimer of a $C_{12}$-$C_{20}$ unsaturated fatty acid and polymethylenediamine having 1 to 6 carbon atoms, diethylenetriamine or triethylenetetramine having an average molecular weight of less than 1500 and an amine value of 200 to 350.--

--15. The epoxy resin composition according to any one of claims 4 to 14, wherein the mixing proportion of the components (1) and (2) is 1 : 0.1 - 15 by weight.--

UNITED STATES PATENT AND TRADEMARK OFFICE
CERTIFICATE OF CORRECTION

PATENT NO. : 4,254,000

DATED : March 3, 1981

INVENTOR(S) : Akira Ohmori et al

It is certified that error appears in the above—identified patent and that said Letters Patent is hereby corrected as shown below:

--16. The epoxy resin composition according to any one of claims 4 to 14, wherein a mixture of the components is subjected to pre-condensation.--

On the cover sheet "3 Claims" should read -- 16 Claims --.

Signed and Sealed this

Fifteenth Day of September 1981

[SEAL]

Attest:

Attesting Officer

GERALD J. MOSSINGHOFF

Commissioner of Patents and Trademarks